United States Patent
Rehn et al.

(10) Patent No.: US 11,381,969 B2
(45) Date of Patent: Jul. 5, 2022

(54) METHOD FOR ESTABLISHING A SECURE WIRELESS CONNECTION

(71) Applicant: Axis AB, Lund (SE)

(72) Inventors: John Rehn, Lund (SE); Marcus Prebble, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/095,964

(22) Filed: Nov. 12, 2020

(65) Prior Publication Data

US 2021/0185530 A1    Jun. 17, 2021

(30) Foreign Application Priority Data

Dec. 16, 2019  (EP) ..................................... 19216583

(51) Int. Cl.
    *H04W 12/06*  (2021.01)
    *H04L 9/40*   (2022.01)

(52) U.S. Cl.
    CPC ....... *H04W 12/068* (2021.01); *H04L 63/0846* (2013.01)

(58) Field of Classification Search
    CPC ... H04W 12/068; H04W 12/75; H04W 12/77; H04W 12/50; H04W 12/043; H04W 12/041; H04W 12/61; H04W 12/06; H04W 12/08; H04W 12/0431; H04W 76/14; H04W 4/70; H04W 4/80; H04W 48/10; H04W 48/18; H04L 63/0846
    See application file for complete search history.

(56) References Cited

U.S. PATENT DOCUMENTS

| | | | |
|---|---|---|---|
| 9,730,071 B1* | 8/2017 | Guo ...................... | H04W 12/06 |
| 10,033,531 B2* | 7/2018 | Tse ........................ | H04W 12/06 |
| 10,574,475 B2* | 2/2020 | Drake .................. | H04L 12/2809 |
| 2006/0133613 A1* | 6/2006 | Ando .................... | H04L 63/205 |
| | | | 380/270 |

(Continued)

FOREIGN PATENT DOCUMENTS

| | | |
|---|---|---|
| EP | 1965595 A1 | 9/2008 |
| WO | 2017/053736 A1 | 3/2017 |

OTHER PUBLICATIONS

Extended European Search Report dated Jun. 5, 2020 for the European Patent Application No. 19216583.5.

*Primary Examiner* — Saleh Najjar
*Assistant Examiner* — Khalid M Almaghayreh
(74) *Attorney, Agent, or Firm* — Volpe Koenig (57) ABSTRACT

Systems and methods are disclosed that provide a secure wireless connection between two electronic devices. Techniques disclosed comprise: generating, on a server, a temporary code; registering, on a first device, the temporary code; sending, from the server to a second device, the temporary code; determining, on the first device, a first temporary credential based on the temporary code; determining, on the second device, a second temporary credential based on the temporary code; establishing, using the first and the second temporary credentials, a temporary connection between the first and the second devices; determining, on the second device, a secure credential; sending, from the second device to the first device, the secure credential via the temporary connection; and establishing, using the secure credential, a secure connection between the first and the second electronic devices.

12 Claims, 3 Drawing Sheets

(56) References Cited

U.S. PATENT DOCUMENTS

| | | | |
|---|---|---|---|
| 2008/0207171 A1* | 8/2008 | van Willigenburg | G07C 9/27 455/411 |
| 2010/0031036 A1* | 2/2010 | Chauncey | H04W 12/033 713/168 |
| 2010/0278342 A1* | 11/2010 | Pering | H04W 12/04 380/270 |
| 2012/0322384 A1 | 12/2012 | Zerr et al. | |
| 2014/0059351 A1* | 2/2014 | Braskich | H04W 12/04 713/171 |
| 2014/0099887 A1* | 4/2014 | Flanagan | H04W 4/80 455/41.1 |
| 2014/0162600 A1* | 6/2014 | Chang | H04W 12/06 455/411 |
| 2014/0282995 A1* | 9/2014 | Du | H04W 12/06 726/10 |
| 2014/0337957 A1* | 11/2014 | Feekes | H04L 63/0853 726/9 |
| 2015/0289295 A1* | 10/2015 | Granbery | H04W 76/14 370/230 |
| 2016/0036819 A1* | 2/2016 | Zehavi | H04W 48/08 726/4 |
| 2016/0212147 A1* | 7/2016 | Palin | H04L 63/062 |
| 2016/0267729 A1* | 9/2016 | Baumgarte | H04W 48/02 |
| 2017/0149873 A1* | 5/2017 | Jang | H04N 21/4405 |
| 2017/0359309 A1* | 12/2017 | Bolte | H04W 12/088 |
| 2018/0091303 A1 | 3/2018 | Brook et al. | |
| 2018/0176079 A1* | 6/2018 | Teo | H04W 12/069 |
| 2018/0255276 A1 | 9/2018 | Shou et al. | |
| 2019/0014469 A1* | 1/2019 | Dees | H04W 12/06 |
| 2019/0281449 A1* | 9/2019 | Luo | H04L 9/30 |
| 2019/0363904 A1* | 11/2019 | Drake | H04L 63/0442 |
| 2020/0021983 A1* | 1/2020 | Annaiah | H04W 12/50 |
| 2020/0314923 A1* | 10/2020 | Deshmukh | H04W 12/06 |
| 2020/0358769 A1* | 11/2020 | Belov | H04L 63/0884 |

\* cited by examiner

METHOD FOR ESTABLISHING A SECURE WIRELESS CONNECTION

TECHNICAL FIELD

The present invention relates to establishing a secure wireless connection between a first electronic device and a second electronic device.

BACKGROUND

Secure digital communication is in general protected against interception in some way or another. Standard wired connections, such as ethernet, can be physically protected such that the communication cannot easily be intercepted. Such physical protection can, for example, be achieved by installing the ethernet cabling inside the walls of a building.

However, there are a wide range of different scenarios where wired connections are not suitable, and thus require wireless connections, for example via WI-FI. Such connections cannot be physically protected and are therefore less secure, which is often remedied by encrypting the wireless communication channel and requiring a passcode in order to connect.

The security of the wireless communication channel is thus related to the complexity of the passcode needed to connect. Therefore, wireless communication channels are typically protected by complex passcodes in order to increase the security. However, complex passcodes are difficult for an end-user to remember, why they are often stored in written form close to a device (e.g. on the desk next to a computer) used to access the wireless communication channel. As such, complex passcodes can in some circumstances result in a reduced security of the wireless connection. An alternative is therefore to use less complex passcodes that an end-user can easily remember, however, such passcodes are typically easy for an unauthorized user or a computer to guess, thereby reducing the security of the wireless communication channel.

Thus, there is a need for an improved method for establishing secure wireless connections.

SUMMARY

Mitigating, alleviating or eliminating one or more of the above-identified deficiencies in the art and disadvantages singly or in any combination and solve at least the above-mentioned problem would be beneficial. In particular, providing a method for establishing a secure wireless connection between a first electronic device and a second electronic device is desirable.

According to a first aspect, a method for establishing a secure wireless connection between a first electronic device and a second electronic device is provided. The method comprises: generating, on a server, a temporary code; registering, on the first electronic device, the temporary code; sending, from the server to the second electronic device, the temporary code; determining, on the first electronic device, a first temporary credential based on the temporary code; determining, on the second electronic device, a second temporary credential based on the temporary code; establishing, using the first temporary credential and the second temporary credential, a temporary wireless connection between the first electronic device and the second electronic device; determining, on the second electronic device, a secure credential; sending, from the second electronic device to the first electronic device, the secure credential via the temporary wireless connection; and establishing, using the secure credential, the secure wireless connection between the first electronic device and the second electronic device.

Thus, the secure wireless connection is allowed using a lower-security code, e.g., a short human-readable alphanumeric code. A short human-readable alphanumeric code is easy for a user to remember, however, as is known within the art, such simple codes are typically easy to guess (for a human and/or a computer) and a wireless connection which is based on such code is inherently insecure. However, by means of the present method, the security associated with the secure wireless connection between the first and second electronic devices may be enhanced compared to a connection which is based only on the temporary code (i.e. the temporary wireless connection).

The secure credential may be determined on the server, and subsequently sent from the server to the second electronic device. The power consumption of the second electronic device related to determining the secure credential may thereby be reduced.

The method may further comprise: determining, at the first electronic device, a temporary wake-up code based on the temporary code; determining, at the second electronic device, the temporary wake-up code based on the temporary code; and wherein the step of establishing the temporary wireless connection comprises: broadcasting, by the first electronic device and using a first wireless communication protocol, the temporary wake-up code, listening, at the second electronic device, for the broadcasted temporary wake-up code, and upon detecting the broadcasted temporary wake-up code at the second electronic device, enabling, at the second electronic device, a second wireless communication protocol; wherein the temporary wireless connection is established using the second wireless communication protocol.

An associated possible advantage is that a power consumption related to the second electronic device may be reduced, since the second wireless communication protocol may be deactivated until the second electronic device detects the temporary wake-up code.

A further associated possible advantage is that a security related to the temporary wireless connection may be increased, since the second electronic device is not accessible via the second wireless communication protocol prior to detecting the temporary wake-up code. Hence, unauthorized devices, i.e. devices without access to the temporary wake-up code, may not be able to connect via the second wireless communication protocol.

The method may further comprise: determining, at the second electronic device, a secure wake-up code; sending, from the second electronic device to the first electronic device, the secure wake-up code via the temporary wireless connection; and wherein the step of establishing the secure wireless connection comprises: broadcasting, by the first electronic device and using a first wireless communication protocol, the secure wake-up code, listening, at the second electronic device, for the broadcasted secure wake-up code, and upon detecting the broadcasted secure wake-up code at the second electronic device, enabling, at the second electronic device, a further wireless communication protocol; wherein the secure wireless connection is established using the further wireless communication protocol.

An associated possible advantage is that a security related to the secure wireless connection may be increased, since the second electronic device is not accessible via the further wireless communication protocol prior to detecting the secure wake-up code. Hence, unauthorized devices, i.e. devices without access to the secure wake-up code, may not be able to connect via the further wireless communication protocol.

The method may further comprise: disconnecting the temporary wireless connection.

An associated possible advantage is that a power consumption related to the temporary wireless connection may be reduced.

A further associated possible advantage is that a security related to the connection between the first and second electronic devices may increase, since the temporary wireless connection (i.e. the low-security connection) is disconnected, thereby preventing unauthorized access (e.g. by surveillance/monitoring of the connection) to data transfer via the temporary wireless connection. Thus, the security related to unauthorized access to the secure credentials and/or the secure wake-up code may thereby be enhanced.

The method may further comprise: discarding, at the second electronic device, the second temporary credential.

An associated possible advantage is that a security related to the second electronic device may be enhanced, since wireless connections to the second electronic device based on the second temporary credential may not be allowed after discarding the second temporary credential.

The method may further comprise: triggering the temporary code generation in response to a personal identification.

The temporary code may be sent from the server to the second electronic device via a wired connection.

An associated possible advantage is that an enhanced security related to the temporary wireless connection may be allowed, since the temporary code is sent to the second electronic device via the wired connection and is therefore not accessible via a wireless communication protocol. The wired connection may be physically protected (e.g. physical enclosures) which thereby prevents unauthorized access to the wired connection. Hence, unauthorized devices (i.e. devices without access to the wired connection) may not be able to receive the temporary code from the server.

The method may further comprise: choosing, by the server, the second electronic device among a plurality of second electronic devices.

According to a second aspect, a non-transitory computer-readable storage medium having stored thereon a program which is executable on a first electronic device having processing capabilities is provided. The program comprises program code portions which when executed on the first electronic device is configured to: register a temporary code; determine a temporary credential based on the temporary code; establish, using the temporary credential, a temporary connection between the first electronic device and a second electronic device; receive, from the second electronic device, a secure credential via the temporary connection; and establish, using the secure credential, a secure connection between the first electronic device and the second electronic device.

The above-mentioned features of the first aspect, when applicable, apply to this second aspect as well. In order to avoid undue repetition, reference is made to the above.

The program of the second aspect may further comprise program code portions which when executed on the first electronic device is configured to: determine a temporary wake-up code based on the temporary code; broadcast the temporary wake-up code using a first wireless communication protocol; and establish the temporary connection to the second electronic device using a second wireless communication protocol.

The program of the second aspect may further comprise program code portions which when executed on the first electronic device is configured to: receive, from the second electronic device, a secure wake-up code; broadcast the secure wake-up code using the first wireless communication protocol; and establish the secure connection using the second wireless communication protocol.

According to a third aspect, a non-transitory computer-readable storage medium having stored thereon a program which is executable on an electronic device having processing capabilities is provided. The program comprises program code portions which when executed on the electronic device is configured to: receive, from a server, a temporary code; determine a temporary credential based on the temporary code; establish, using the temporary credential, a temporary connection between the electronic device and a further electronic device; determine a secure credential; sending, to the further electronic device, the secure credential via the temporary connection; and establish, using the secure credential, a secure connection between the electronic device and the further electronic device.

The above-mentioned features of the first and/or the second aspects, when applicable, apply to this third aspect as well. In order to avoid undue repetition, reference is made to the above.

The program of the third aspect may further comprise program code portions which when executed on the electronic device is configured to: determine a temporary wake-up code based on the temporary code; listen, using a first wireless communication protocol, for a broadcasted temporary wake-up code; upon detecting the broadcasted temporary wake-up code, enable a second wireless communication protocol; and establish the temporary connection using the second wireless communication protocol.

The program of the third aspect may further comprise program code portions which when executed on the electronic device is configured to: determine a secure wake-up code; send, to the further electronic device, the secure wake-up code; listen, using a first wireless communication protocol, for a broadcasted secure wake-up code; upon detecting the broadcasted secure wake-up code, enable a second wireless communication protocol; and establish the secure connection using the second wireless communication protocol.

According to a fourth aspect a server is provided. The server is configured to: generate a temporary code; present the temporary code to a user of a first electronic device; choose a second electronic device from a plurality of second electronic devices; and send the temporary code to the second electronic device chosen from the plurality of second electronic devices.

The above-mentioned features of the first, second, and/or third aspects, when applicable, apply to this fourth aspect as well. In order to avoid undue repetition, reference is made to the above.

A further scope of applicability of the present disclosure will become apparent from the detailed description given below. However, it should be understood that the detailed description and specific examples, while indicating preferred variants of the present concepts, are given by way of illustration only, since various changes and modifications within the scope of the concepts will become apparent to those skilled in the art from this detailed description.

Hence, it is to be understood that the concepts herein are not limited to the particular steps of the methods described or component parts of the systems described as such method and system may vary. It is also to be understood that the terminology used herein is for purpose of describing particular embodiments only and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present concepts will now be described in more detail, with reference to appended drawings showing variants of the invention. The figures should not be considered limiting the concepts to the specific variant; instead they are used for explaining and understanding the concepts.

As illustrated in the figures, the sizes of layers and regions are exaggerated for illustrative purposes and, thus, are provided to illustrate the general structures of variants of the present concepts. Like reference numerals refer to like elements throughout.

DETAILED DESCRIPTION

The present embodiments will now be described more fully hereinafter with reference to the accompanying drawings, in which currently preferred variants of the concepts are shown. These concepts may, however, be implemented in many different forms and should not be construed as limited to the variants set forth herein; rather, these variants are provided for thoroughness and completeness, and fully convey the scope of the present concepts to the skilled person.

FIG. 1A-1D illustrates an example scenario 10 where a secure connection between a first electronic device 1120 and a second electronic device 1132 is established. The scenario 10 comprises a server 1110, a user of the first device 1120, and a plurality 1130 of second devices.

Figure 1A:
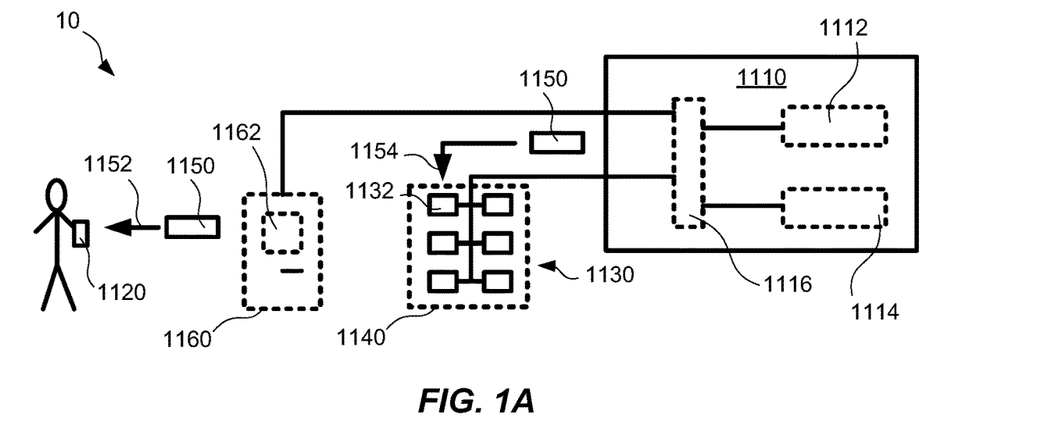
FIG. 1A illustrates an example scenario comprising a first electronic device, a second electronic device, and a server.

As is shown in the example in FIG. 1A, the server 1110 may comprise a processing unit 1112 and/or a non-transitory computer-readable storage medium 1114. The processing unit 1112 and the non-transitory computer-readable storage medium 1114 may communicate via a data bus 1116.

The first electronic device 1120 may be a personal electronic device. The first electronic device 1120 may be a portable electronic device. The first electronic device 1120 may be mobile phone (e.g. a smartphone), as is shown in the example in FIG. 1A-D. The first electronic device 1120 may comprise a processing unit and/or non-transitory computer-readable storage medium (not shown in FIG. 1A-D).

The plurality 1130 of second devices may be a plurality of portable electronic devices. As is shown in the example in FIG. 1A-C, the portable electronic devices may, e.g., be body-worn cameras. It is to be understood that the present embodiments are by no means limited to such portable electronic devices, and the first/second electronic devices may, e.g., be an entertainment system (e.g., a car stereo) and/or other electronic devices between which a secure wireless connection is desired. Each of the plurality 1130 of second electronic devices may comprise a processing unit and/or a non-transitory computer-readable storage medium (not shown in FIG. 1A-D). The non-transitory computer-readable storage medium may, e.g., comprise an SD card and/or an SSD disk drive.

The plurality 1130 of second devices may be stored in a storage compartment 1140 as exemplified in FIG. 1A. The storage compartment 1140 may, e.g., be a storage rack. The storage compartment 1140 may be arranged to charge a power source of a second device when it is stored in the storage compartment 1140. The storage compartment 1140 may be arranged to communicate with the server 1110. The storage compartment 1140 may communicate a health and/or a presence of each of the plurality 1130 of second devices to the server 1110. The health of each of the plurality 1130 of the second electronic devices may be related to a battery charge level, a maximum battery charge level, a maximum battery capacity, and/or status of the non-transitory computer-readable storage medium (e.g., available space, condition, age, etc.). Each of the plurality 1130 of second electronic devices may be arranged to communicate its health to the server 1110.

At the start of the process of establishing a secure wireless connection 1400 between the first electronic device 1120 (e.g. the smartphone in FIG. 1A) and the second electronic device 1132 (e.g. the body-worn camera in FIG. 1A), a temporary code 1150 is generated on the server 1110. The generation of the temporary code 1150 may be initiated by the user at a front-end 1160 arranged to communicate with the server 1110, as exemplified in FIG. 1A. The temporary code 1150 may be generated in response to a personal identification. The personal identification may be the user registering a personal identity. The personal identity may be registered at the front-end 1160. The personal identity may be registered by entering a user name and/or password. The personal identity may be registered by registering a personal identification card at the front-end 1160. The personal identity may be registered via biometric authentication at the front-end 1160. Biometric authentication may comprise facial recognition, fingerprint recognition, palm recognition, eye scanning, iris recognition, and/or retina recognition. The temporary code 1150 may be generated on the server 1110 using the processing unit 1112 of the server 1110. The temporary code 1150 may be generated based on the personal identification of the user and/or on random numbers and/or on pseudo-random numbers generated by the server 1110. The temporary code 1150 may be a human-readable alphanumeric PIN code. The temporary code 1150 may be an alphanumeric code. The alphanumeric code may comprise, e.g., four to six digits. The temporary code 1150 may thereby be easy for the user to read and/or memorize, and to register on the first electronic device 1120. The temporary code 1150 may be a complex code represented by a pattern, e.g. a QR code. The temporary code 1150 may be a sequence of bytes and/or an array of bytes. The pattern may be displayed to the user on a display 1162 of the front-end 1160. The server 1110 may be arranged to communicate with a printer (not shown in FIG. 1A-D), and the pattern may be printed on a piece of paper accessible to the user of the first electronic device 1120.

The temporary code 1150 is registered (represented by arrow 1152 in FIG. 1A) on the first electronic device 1120. The temporary code 1150 may be registered on the first electronic device 1120 by the user of the first device 1120. The registration may be a manual input of the temporary code 1150 and/or by scanning the pattern (e.g. the QR code) representing the temporary code 1150. The pattern representing the temporary code 1150 may be scanned by use of a camera and/or a scanner of the first electronic device 1120. It is to be understood that the temporary code 1150 need not be registered on the first electronic device 1120 immediately after the temporary code 1150 has been generated on the server 1110. The delay between the generation of the temporary code 1150 and the temporary code 1150 being registered on the first electronic device 1120 may be minutes, hours, or even days.

The registration of the temporary code 1150 may be allowed through the use of email and/or a messaging service (e.g., SMS, iMessage, WHATSAPP etc.). The temporary code 1150 may be registered on the first electronic device 1120 by sending, from the server 1110, to the first electronic device 1120 an email and/or a message comprising the temporary code 1150.

The server 1110 may choose the second electronic device 1132 among the plurality 1130 of second electronic devices. The server 1110 may choose the second electronic device 1132 among the plurality 1130 of second electronic devices based on the health of each of the plurality 1130 of second electronic devices. For example, the server 1110 may be configured to choose the second electronic device having the highest battery charge level among the plurality 1130 of second electronic devices.

The temporary code 1150 is sent (represented by arrow 1154 in FIG. 1A) from the server 1110 to the second device 1132. The temporary code 1150 may be sent from the server 1110 to the second electronic device 1132 via a wired connection. The wired connection between the server 1110 and the second electronic device 1132 may be physically enclosed and/or protected. The wired connection may, e.g., be installed such that it is difficult, or even impossible, to tamper with the wired connection. Hence, the wired connection allows for secure data transfers between the server 1110 and the plurality 1130 of second electronic devices. The wired connection between the server 1110 and the second electronic device 1132 may be detachable. The wired connection may be any type of wired connection configured to transmit data. Examples of wired connections comprise ethernet, USB, Firewire, etc. It is to be understood that the wired connection between the server 1110 and the second electronic device 1132 may comprise a short-range wireless connection. In this context, the short-range wireless connection may be based on near-field magnetic induction communication.

Figure 1B:
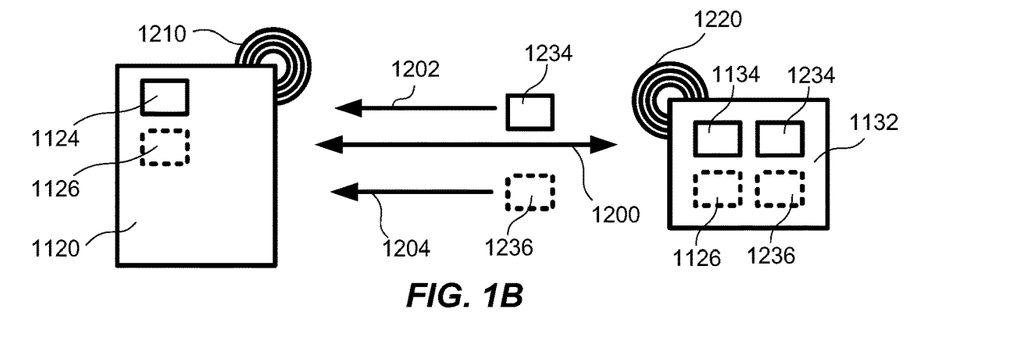
FIG. 1B illustrates a temporary connection between the first electronic device and the second electronic device.

As is shown in the example of FIG. 1B, a first temporary credential 1124 is determined based on the temporary code 1150 on the first electronic device 1120. The first temporary credential 1124 may be determined using the processing unit of the first electronic device 1120. The first temporary credential 1124 may be stored on a non-transitory computer-readable storage medium comprised in the first electronic device 1120.

As is shown in the example of FIG. 1B, a second temporary credential 1134 is determined based on the temporary code 1150 on the second electronic device 1132. The second temporary credential 1134 may be determined using the processing unit of the second electronic device 1132. The second temporary credential 1134 may be stored on a non-transitory computer-readable storage medium comprised in the second electronic device 1132.

The first temporary credential 1124 and the second temporary credential 1134 may be complimentary credentials. The first temporary credential 1124 and the second temporary credential 1134 may be identical. The first temporary credential 1124 and/or the second temporary credential 1134 may be determined by a key derivation function using the temporary code 1150 as input. As is known within the art, a key derivation function determines/derives one or more outputs (e.g., the first/second temporary credential 1124, 1134) from an input (e.g., the temporary code 1150). The output of the key derivation function may contain more characters than the input. The key derivation function determining the first temporary credential 1124 may be identical to the key derivation function determining the second temporary credential 1134, whereby the first temporary credential 1124 may be identical to the second temporary credential 1134. The first temporary credential 1124 and the second temporary credential 1134 may be determined further based on a shared secret. The key derivation function may use the shared secret as an additional input. The shared secret may be a secret known to the first electronic device 1120 and the second electronic device 1132. The shared secret may be a secret hardcoded to the first electronic device 1120 and the second electronic device 1132. The shared secret may be based on personal information of the user. The shared secret may be a user number, a personal name, an agency id, etc. The shared secret may be known by the first electronic device (e.g. in case the first electronic device is a personal electronic device associated with the user), and upon registration of the personal identity, the shared secret may be known to the server 1110. The server 1110 may thereby transfer the shared secret to the second electronic device 1132.

A temporary wake-up code 1126 may be determined based on the temporary code 1150 on the first electronic device 1120 and on the second electronic device 1132, as is exemplified in FIG. 1B.

As is shown in the example of FIG. 1B, a temporary wireless connection 1200 between the first electronic device 1120 and the second electronic device 1132 is established using the first temporary credential 1124 and the second temporary credential 20 1134. The temporary code 1150 and/or the secondary temporary credential 1134 may be valid only for a limited time period. In other words, the second electronic device 1132 may refuse establishing the temporary wireless connection 1200 in case the temporary wireless connection 1200 is trying to be established at a time not within the limited time period. A length of the limited time period may be implementation specific. For example, in some implementations the limited time period may preferably be short (e.g., seconds or minutes), while in others it may be longer (e.g., hours or days). By limiting the time period during which the temporary code 1150 and/or the secondary temporary credential 1134 is valid may enhance the security associated with the temporary wireless connection 1200. The limited time period may start when the temporary code 1150 is generated on the server 1110.

Prior to, or in conjunction with, sending the temporary code 1150 from the server 1110 to the second electronic device 1132, the server 1110 may send timing information to the second electronic device 1132. The timing information may comprise information relating to the time/date of the start of the limited time period (e.g., when the temporary code 1150 was generated), and the length of the limited time period. Using the timing information, the second electronic device 1132 may determine if establishing the temporary wireless connection 1200 should be allowed or not.

During establishment of the temporary wireless connection 1200, the temporary wake-up code 1126 may be broadcasted 1210 by the first electronic device 1120 using a first wireless communication protocol. The first wireless communication protocol may be a low-energy wireless communication protocol and/or a short-range wireless communication protocol.

The low-energy wireless communication protocol may be BLUETOOTH Low Energy and/or Near-Field Communication (NFC). The second electronic device 1132 may listen 1220 for the broadcasted temporary wake-up code 1126, and upon detecting the broadcasted temporary wake-up code 1126 a second wireless protocol may be enabled on the second device 1132.

The second wireless communication protocol may be WI-FI. The temporary wireless connection 1200 may be established using the second communication protocol. After the temporary wireless connection 1200 is established, the temporary wake-up code 1126 may be discarded and/or disabled on the second electronic device 1132. Thus, after the temporary wireless connection 1200 is established, the second electronic device 1132 may no longer be listening for the broadcasted temporary wake-up code 1126, thereby increasing the security related to the second electronic device 1132.

As is shown in the example of FIG. 1B, a secure credential 1234 is determined on the second electronic device 1132. The secure credential 1234 may be a sequence/an array of random numbers, a sequence/an array of pseudo-random numbers, and/or a sequence/an array of random/pseudo-random bytes generated on the second electronic device 1132. The secure credential 1234 may be associated with a higher security than the first temporary credential 1124 and/or the second temporary credential 1134. The higher security associated with the secure credential 1234 may, e.g., be allowed by setting a longer length (e.g., the length of the sequence/array as described above, or a number of bytes) of the secure credential 1234 than a length (e.g., a number of bytes) of the first temporary credential 1124 and/or the second temporary credential 1134.

Further, as the first/second temporary credentials 1124, 1134 are determined based on the temporary code 1150, the security associated with the first/second temporary credentials 1124, 1134 may be related to a length (e.g., number of bytes) of the temporary code 1150.

The secure credential 1234 may be determined based on a secret only accessible to the second electronic device 1132. The secure credential 1234 may be stored on a non-transitory computer-readable storage medium comprised in the first electronic device 1120 and/or the second electronic device 1132. The secure credential 1234 may be sent from the second electronic device 1132 to the server 1110. The secure credential 1234 may be stored on the non-transitory computer-readable medium 1114 comprised in the server 1110. The secure credential 1234 may be stored with an association to the personal identification of the user.

The secure credential 1234 is sent (represented by arrow 1202 in FIG. 1B) from the second electronic device 1132 to the first electronic device 1120 via the temporary wireless connection 1200.

The secure credential 1234 determined on the server 1110 may be sent from the server 1110 to the second electronic device 1132. A power consumption of the second electronic device 1132 related to determining the secure credential 1234 may thereby be reduced. Subsequent to the secure credential 1234 being sent from the server 1110 to the second electronic device 1132, the secure credential 1234 may be sent from the second electronic device 1132 to the first electronic device 1120 via the temporary wireless connection 1200.

As shown in the example of FIG. 1B, a secure wake-up code 1236 may be determined on the second electronic device 1132. It is to be understood that the secure wake-up code may not be secure as such, as it may be broadcasted unencrypted by the first electronic device 1120. The secure wake-up code 1236 may be sent (represented by arrow 1204 in FIG. 1B) from the second electronic device 1132 to the first electronic device 1120 via the temporary wireless connection 1200. The secure wake-up code 1236 may be sent to the server 1110 and stored on the non-transitory computer-readable storage medium 1114. The secure wake-up code 1236 may be stored with an association to the personal identification of the user.

Figure 1C:
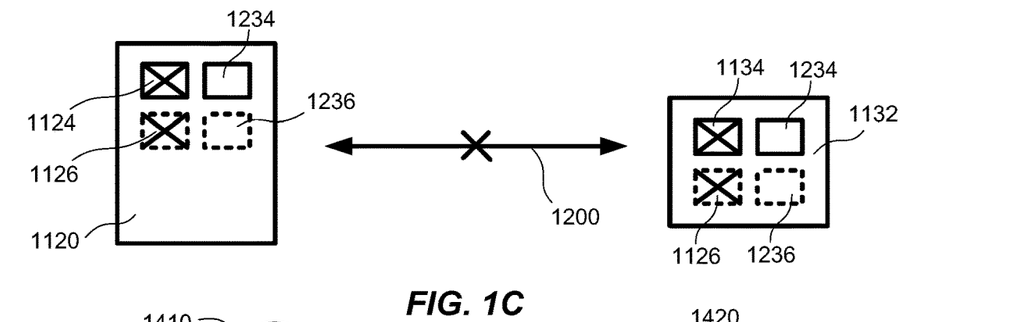
FIG. 1C illustrates the temporary connection between the first electronic device and the second electronic device being disconnected.

Subsequent to the secure credential 1234 and/or the secure wake-up code 1236 being sent from the second electronic device 1132 to the first electronic device 1120 via the temporary wireless connection 1200, the temporary wireless connection 1200 may be disconnected, as exemplified in FIG. 1C.

Subsequent to the secure credential 1234 and/or the secure wake-up code 1236 being sent from the second electronic device 1132 to the first electronic device 1120 via the temporary wireless connection 1200, the second temporary credential 1134 may be discarded on the second electronic device 1132. By discarding the second temporary credential 1134 on the second electronic device 1132, a temporary wireless connection to the second electronic device 1132 is no longer possible based on the second temporary credential 1134, thereby increasing the security associated with the second electronic device 1132.

Similarly, the first temporary credential 1124 may be discarded on the first electronic device 1120. In case the first/second temporary credential 1124, 1134 is stored on a non-transitory computer-readable storage medium comprised in the first/second electronic device 1120, 1132, discarding the first/second temporary credential 1124, 1134 may comprise removing the first/second temporary credential 1124, 1134 from the non-transitory computer-readable storage medium.

Figure 1D:
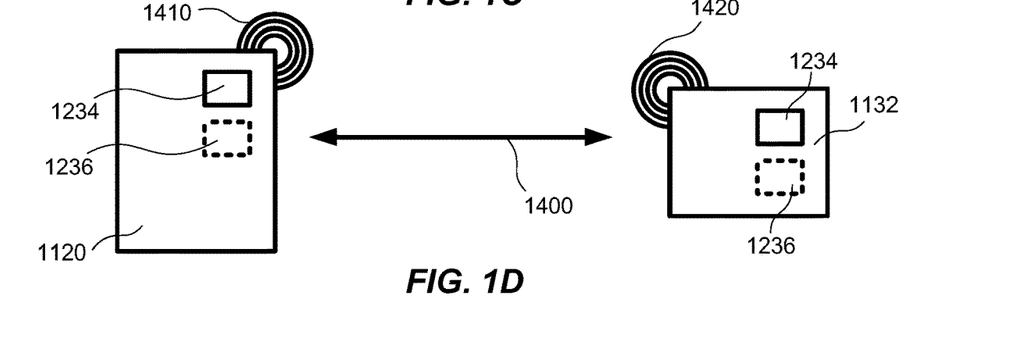
FIG. 1D illustrates a secure connection between the first electronic device and the second electronic device.

As is shown in the example of FIG. 1D, the secure wireless connection 1400 between the first electronic device 1120 and the second electronic device 1132 is established using the secure credential 1234. Thus, the secure wireless connection 1400 between the first electronic device 1120 and the second electronic device 1132 is allowed using a lower-security code (i.e. the temporary code 1150), which may be easy for the user to remember. Security issues that may be associated with the temporary wireless connection 1200 (e.g. that the temporary code 1150 may be easy to guess for a human and/or a computer) is at least partly mitigate by means of the present inventive concept, since the security associated with the secure wireless connection 1400 between the first electronic device 1120 and the second electronic device 1132 is enhanced compared to a connection which is based only on the temporary code 1150 (i.e. the temporary wireless connection 1200).

During establishment of the secure wireless connection 1400, the secure wake-up code 1236 may be broadcasted 1410 by the first electronic device 1120 using the first wireless protocol. The second electronic device 1132 may listen 1420 for the broadcasted secure wake-up code 1236, and upon detecting the broadcasted secure wake-up code 1236 a further wireless communication protocol may be enabled. The further wireless communication protocol may be a high-security wireless communication protocol.

The further wireless communication protocol may be WI-FI. The further wireless communication protocol may be the same protocol as the second wireless communication protocol. The secure wireless connection 1400 may be established using the further wireless communication protocol.

In case the secure credential 1234 (and potentially the secure wake-up code 1236) is stored on the non-transitory computer-readable medium 1114 comprised in the server 1110, the secure credential 1234 may be used when establishing subsequent secure wireless connections between the first electronic device 1120 and a second electronic device (may be the same second electronic device 1132 or a different second electronic device of the plurality 1130 of second electronic devices). In such case, the server 1110 sends the secure credential 1234 to the second electronic device. The server 1110 may send the secure credential 1234 to the second electronic device in response to a personal identification of the user. After the first electronic device 1120 and the second electronic device are woken up, the secure wireless connection may be established without first establishing a temporary wireless connection. The server 1110 may send the secure wake-up code 1236 to the second electronic device, such that it may listen for a broadcasted secure wake-up code 1236 broadcasted by the first electronic device 1120, and wake up in response to detecting the broadcasted secure wake-up code 1236.

Figure 2A:
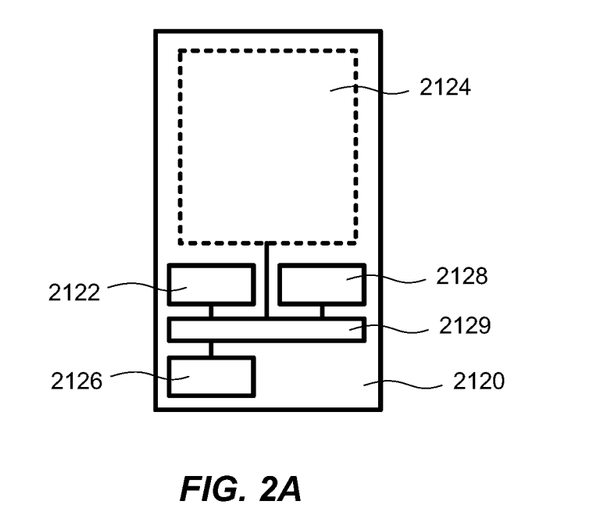
FIG. 2A illustrates a first electronic device comprising a non-transitory computer-readable storage medium and processing capabilities.

FIG. 2A illustrates a first electronic device 2120 comprising a non-transitory computer-readable storage medium 2122 and processing capabilities. In the example shown in FIG. 2A, the first electronic device 2120 is a mobile phone (e.g. a smartphone), however, it is to be understood that this is an example only, and that the first electronic device 2120 may be a different type of device. The first electronic device 2120 of FIG. 2A may correspond to the first electronic device 1120 described in relation to FIG. 1A-1D.

As is shown in the example of FIG. 2A, the first electronic device 2120 may comprise a display 2124, and the processing capabilities may be implemented by a processing unit 2126. As is further shown in the example of FIG. 2A, the first electronic device 2120 may comprise means 2128 for wireless communication. The means 2128 for wireless communication may be configured to communicate via Wi-Fi, Bluetooth, The means 2128 for wireless communication may be configured to communicate via WI-FI, BLUETOOTH, BLUETOOTH Low Energy, mobile networks (3G, 4G, 5G, LTE) etc. The means for wireless communication may be a radio transceiver. The first electronic device 2120 may further comprise a camera (not shown).

The non-transitory computer-readable storage medium 2122, the processing unit 2126, the display 2124, the camera, and/or the means 2128 for wireless communication may communicate via a data bus 2129 as is shown in the example of FIG. 2A.

The non-transitory computer-readable storage medium 2122 in FIG. 2A having stored thereon a program which is executable on the first electronic device 2120. The program may be an application downloadable to the first electronic device 2120 via an application providing service.

The program comprises program code portions which when executed on the first electronic device 2120 is configured to register a temporary code. The program further comprises program code portions which when executed on the first electronic device 2120 is further configured to determine a temporary credential based on the temporary code. The program further comprises program code portions which when executed on the first electronic device 2120 is further configured to establish, using the temporary credential, a temporary connection between the first electronic device 2120 and a second electronic device. The program further comprises program code portions which when executed on the first electronic device 2120 is configured to receive, from the second electronic device, a secure credential via the temporary connection. The program further comprises program code portions which when executed on the first electronic device 2120 is further configured to establish, using the secure credential, a secure connection between the first electronic device 2120 and the second electronic device.

The program may further comprise program code portions which when executed on the first electronic device 2120 is configured to: determine a temporary wake-up code based on the temporary code; broadcast the temporary wake-up code using a first wireless communication protocol; and establish the temporary connection to the second electronic device using a second wireless communication protocol.

The program may further comprise program code portions which when executed on the first electronic device 2120 is configured to: receive, from the second electronic device, a secure wake-up code; broadcast the secure wake-up code using the first wireless communication protocol; and establish the secure connection using the second wireless communication protocol.

Figure 2B:
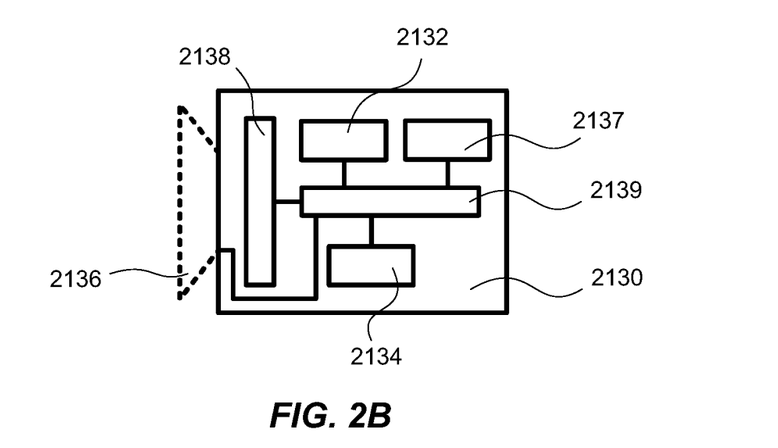
FIG. 2B illustrates a second electronic device comprising a non-transitory computer-readable storage medium and a processing unit.

FIG. 2B illustrates a second electronic device 2130 comprising a non-transitory computer-readable storage medium 2132 and processing capabilities. In the example shown in FIG. 2B, the second electronic device 2130 is a body-worn camera, however, it is to be understood that this is an example only, and that the second electronic device 2130 may be a different type of device. The second electronic device 2130 of FIG. 2B may correspond to the second electronic device 1132 described in relation to FIG. 1A-1D. As is shown in the example of FIG. 2B, the processing capabilities may be implemented by a processing unit 2134, and the second electronic device 2130 may comprise imaging optics 2136 and an image sensor 2138. Further, the second electronic device 2130 may comprise means 2137 for wireless communication.

The means 2137 for wireless communication may be configured to communicate via WI-FI, BLUETOOTH, BLUETOOTH Low Energy, mobile networks (3G, 4G, 5G, LTE) etc. The means for wireless communication may be a radio transceiver. The non-transitory computer-readable storage medium, the processing unit, the image sensor, and/or the imaging optics may communicate via a data bus 2139 as is shown in the example of FIG. 2B.

The non-transitory computer-readable storage medium in FIG. 2B having stored thereon a program which is executable on the second electronic device having processing capabilities. The program comprises program code portions which when executed on the second electronic device 2130 is configured to receive, from a server, a temporary code. The program further comprises program code portions which when executed on the second electronic device 2130 is further configured to determine a temporary credential based on the temporary code. The program further comprises program code portions which when executed on the second electronic device 2130 is further configured to establish, using the temporary credential, a temporary connection between the second electronic device 2130 and a first electronic device 1120, 2120. The program further comprises program code portions which when executed on the second electronic device 2130 is further configured to determine a secure credential. The program further comprises program code portions which when executed on the second electronic device 2130 is further configured to sending, to the first electronic device, the secure credential via the temporary connection.

The program further comprises program code portions which when executed on the second electronic device 2130 is further configured to establish, using the secure credential, a secure connection between the second electronic device 2130 and the first electronic device.

The program may further comprise program code portions which when executed on the second electronic device 2130 is configured to: determine a temporary wake-up code based on the temporary code; listen, using a first wireless communication protocol, for a broadcasted temporary wake-up code; upon detecting the broadcasted temporary wake-up code, enable a second wireless communication protocol; and establish the temporary connection using the second wireless communication protocol.

The program may further comprise program code portions which when executed on the second electronic device 2130 is configured to: determine a secure wake-up code; send, to the first electronic device, the secure wake-up code; listen, using a first wireless communication protocol, for a broadcasted secure wake-up code; upon detecting the broadcasted secure wake-up code, enable a second wireless communication protocol; and establish the secure connection using the second wireless communication protocol.

Figure 2C:
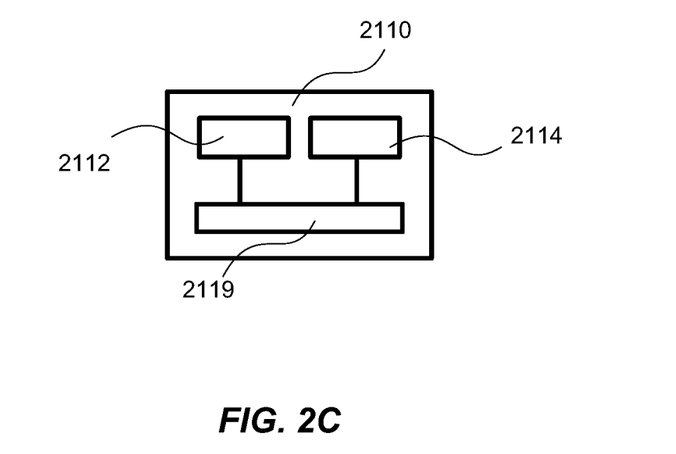
FIG. 2C illustrates a server.

FIG. 2C illustrates a server 2110. As is shown in the example in FIG. 2C, the server 2110 may comprise a non-transitory computer-readable storage medium 2112 and a processing unit 2114. The non-transitory computer-readable storage medium 2112 and the processing unit 2114 may communicate via a data bus 2119. The server 2110 of FIG. 2C may correspond to the server 1110 described in relation to FIG. 1A-1D. The server 2110 is configured to generate a temporary code. The server 2110 is further configured to present the temporary code to a user of a first electronic device. The server 2110 may present the temporary code to the user of the first electronic device on a display associated with the server 2110 (e.g. on a front-end communicating with the server 2110) and/or printed on piece of paper produced by a printer in communication with the server 2110. The server 2110 is further configured to choose a second electronic device from a plurality of second electronic devices. The server 2110 is further configured to send the temporary code to the second electronic device chosen from the plurality of second electronic devices.

Any of the functions of the server 2110 may be hardware and/or software implemented. Some of the functions may, e.g., be implemented using the processing unit 2114. The non-transitory computer-readable storage medium 2112 may store the temporary code and/or any programs implementing the functions of the server 2110.

Figure 3:
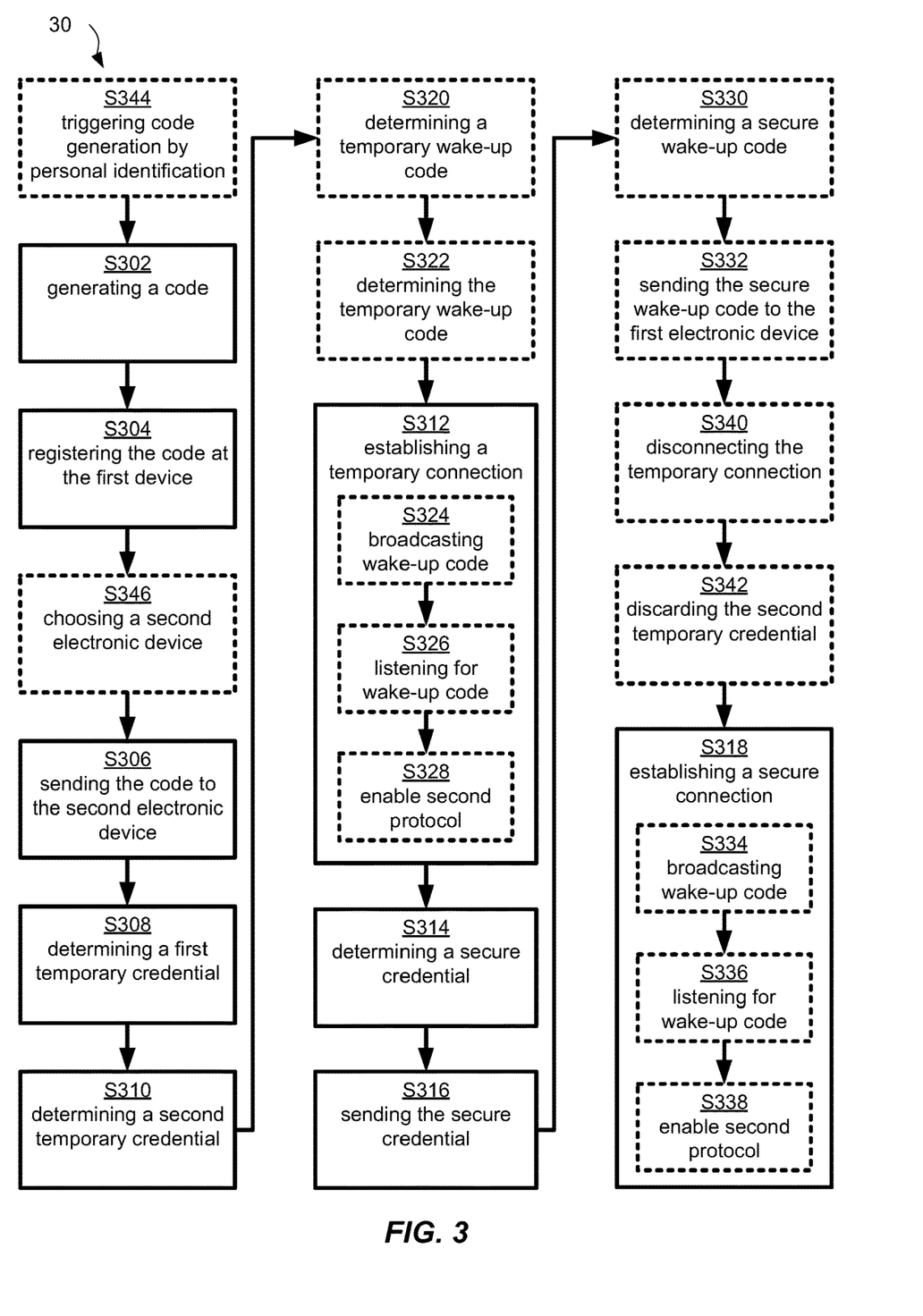
FIG. 3 is a block scheme of a method for establishing a secure wireless connection between a first electronic device and a second electronic device.

FIG. 3 is a block scheme of a method 30 for establishing a secure wireless connection 1400 between a first electronic device 1120 and a second electronic device 1132. The method 30 comprises the following steps/acts. The steps/acts may be performed in any suitable order. Generating S302, on a server 1110, a temporary code 1150. Registering S304, on the first electronic device 1120, the temporary code 1150. Sending S306, from the server 1110 to the second electronic device 1132, the temporary code 1150. Determining S308, on the first electronic device 1120, a first temporary credential 1124 based on the temporary code 1150. Determining S310, on the second electronic device 1132, a second temporary credential 1134 based on the temporary code 1150. Establishing S312, using the first temporary credential 1124 and the second temporary credential 1134, a temporary wireless connection 1200 between the first electronic device 1120 and the second electronic device 1132. Determining S314, on the second electronic device 1132, a secure credential 1234.

Sending S316, from the second electronic device 1132 to the first electronic device 1120, the secure credential 1234 via the temporary 10 wireless connection 1200. Establishing S318, using the secure credential 1234, the secure wireless connection 1400 between the first electronic device 1120 and the second electronic device 1132.

The step of establishing S312 the temporary wireless connection 1200 may comprise broadcasting S324, by the first electronic device 1120 and using a first wireless communication protocol, the temporary wake-up code 1126, listening S326, at the second electronic device 1132, for the broadcasted temporary wake-up code 1126, and upon detecting the broadcasted temporary wake-up code 1126 at the second electronic device 1132, enabling S328, at the second electronic device 1132, a second wireless communication protocol. The temporary wireless connection 1200 may be established using the second wireless communication protocol.

The step of establishing S318 the secure wireless connection 1400 may comprise broadcasting S334, by the first electronic device 1120 and using a first wireless communication protocol, the secure wake-up code 1236, listening S336, at the second electronic device 1132, for the broadcasted secure wake-up code 1236, and upon detecting the broadcasted secure wake-up code 1236 at the second electronic device 1132, enabling S338, at the second electronic device 1132, a further wireless communication protocol; wherein the secure wireless connection 1400 is established using the further wireless communication protocol.

The method 30 may further comprise determining S320, at the first electronic device 1120, a temporary wake-up code 1126 based on the temporary code 1150.

The method 30 may further comprise determining S322, at the second electronic device 1132, the temporary wake-up code 1126 based on the temporary code 1150.

The method 30 may further comprise determining S330, at the second electronic device 1132, a secure wake-up code 1236.

The method 30 may further comprise sending S332, from the second electronic device 1132 to the first electronic device 1120, the secure wake-up code 1236 via the temporary wireless connection 1200.

The method 30 may further comprise disconnecting S340 the temporary wireless connection 1200.

The method 30 may further comprise discarding S342, at the second electronic device 1132, the second temporary credential 1134.

The method 30 may further comprise triggering S344 the temporary code generation in response to a personal identification.

The temporary code 1150 may be sent from the server 1110 to the second electronic device 1132 via a wired connection.

The method 30 may further comprise choosing S346, by the server 1110, the second electronic device 1132 among a plurality 1130 of second electronic devices.

The person skilled in the art realizes that the present embodiments are by no means limited to the preferred variants described above. On the contrary, many modifications and variations are possible within the scope of the appended claims.

Additionally, variations to the disclosed variants can be understood and effected by the skilled person in practicing the claims, from a study of the drawings, the disclosure, and the appended claims.

The invention claimed is:

1. A method for establishing a secure wireless connection between a first electronic device and a second electronic device, the method comprising:
generating, on a server, a temporary code;
registering, on the first electronic device, the temporary code, wherein the temporary code is registered on the first electronic device by a user of the first electronic device;
sending, from the server to the second electronic device via a wired connection, the temporary code;
determining, on the first electronic device, a first temporary credential being an output from a first key derivation function using the temporary code as input;
determining, on the second electronic device, a second temporary credential being an output from a second key derivation function using the temporary code as input;
establishing, using the first temporary credential and the second temporary credential, a temporary wireless connection between the first electronic device and the second electronic device;
determining, on the second electronic device, a secure credential;
sending, from the second electronic device to the first electronic device, the secure credential via the temporary wireless connection; and
establishing, using the secure credential, the secure wireless connection between the first electronic device and the second electronic device.

2. The method according to claim 1, further comprising:
determining, at the first electronic device, a temporary wake-up code based on the temporary code;
determining, at the second electronic device, the temporary wake-up code based on the temporary code; and
wherein the step of establishing the temporary wireless connection comprises:
broadcasting, by the first electronic device and using a first wireless communication protocol, the temporary wake-up code,
listening, at the second electronic device, for the temporary wake-up code broadcasted by the first electronic device, and
upon detecting the temporary wake-up code broadcasted by the first electronic device at the second electronic device, enabling, at the second electronic device, a second wireless communication protocol;
wherein the temporary wireless connection is established using the second wireless communication protocol.

3. The method according to claim 1, further comprising:
determining, at the second electronic device, a secure wake-up code;
sending, from the second electronic device to the first electronic device, the secure wake-up code via the temporary wireless connection; and
wherein the step of establishing the secure wireless connection comprises:
broadcasting, by the first electronic device and using a first wireless communication protocol, the secure wake-up code,
listening, at the second electronic device, for the secure wake-up code broadcasted by the first electronic device, and
upon detecting the secure wake-up code broadcasted by the first electronic device at the second electronic device, enabling, at the second electronic device, a further wireless communication protocol;
wherein the secure wireless connection is established using the further wireless communication protocol.

4. The method according to claim 1, further comprising:
disconnecting the temporary wireless connection.

5. The method according to claim 1, further comprising:
discarding, at the second electronic device, the second temporary credential.

6. The method according to claim 1, further comprising:
triggering the temporary code generation in response to a personal identification.

7. The method according to claim 1, further comprising:
choosing, by the server, the second electronic device among a plurality of second electronic devices.

8. A non-transitory computer-readable storage medium having stored thereon a program which is executable on a first electronic device having processing capabilities, wherein the program comprises program code portions which when executed on the first electronic device is configured to:
register, by a user of the first electronic device, a temporary code;
determine a temporary credential being an output from a key derivation function using the temporary code as input;
determine a temporary wake-up code based on the temporary code;
broadcast the temporary wake-up code using a first wireless communication protocol;
establish, using the temporary credential and using a second wireless communication protocol, a temporary connection between the first electronic device and a second electronic device, wherein the second wireless communication protocol is different from the first wireless communication protocol;
receive, from the second electronic device, a secure credential via the temporary connection;
establish, using the secure credential and using the second wireless communication protocol, a secure connection between the first electronic device and the second electronic device.

9. The non-transitory computer-readable storage medium according to claim 8, wherein the program further comprises program code portions which when executed on the first electronic device is configured to:
receive, from the second electronic device, a secure wake-up code;

broadcast the secure wake-up code using the first wireless communication protocol; and establish the secure connection using the second wireless communication protocol.

10. A non-transitory computer-readable storage medium having stored thereon a program which is executable on an electronic device having processing capabilities, wherein the program comprises program code portions which when executed on the electronic device is configured to:

receive, from a server via a wired connection, a temporary code;

determine a temporary credential being an output from a key derivation function using the temporary code as input;

establish, using the temporary credential, a temporary connection between the electronic device and a further electronic device;

determine a secure credential;

sending, to the further electronic device, the secure credential via the temporary connection;

establish, using the secure credential, a secure connection between the electronic device and the further electronic device.

11. The non-transitory computer-readable storage medium according to claim 10, wherein the program further comprises program code portions which when executed on the electronic device is configured to:

determine a temporary wake-up code based on the temporary code;

listen, using a first wireless communication protocol, for a broadcast of the temporary wake-up code;

upon detecting the broadcast of the temporary wake-up code, enable a second wireless communication protocol; and establish the temporary connection using the second wireless communication protocol.

12. The non-transitory computer-readable storage medium according to claim 10, wherein the program further comprises program code portions which when executed on the electronic device is configured to:

determine a secure wake-up code;

send, to the further electronic device, the secure wake-up code;

listen, using a first wireless communication protocol, for a broadcast of the secure wake-up code;

upon detecting the broadcast of the secure wake-up code, enable a second wireless communication protocol; and establish the secure connection using the second wireless communication protocol.

* * * * *